United States Patent [19]
Mueller

[11] 3,751,149
[45] Aug. 7, 1973

[54] CAMERA SHUTTER CONTROL SYSTEM
[75] Inventor: Arthur C. Mueller, Niles, Ill.
[73] Assignee: Bell & Howell Company, Chicago, Ill.
[22] Filed: Jan. 3, 1972
[21] Appl. No.: 214,636

[52] U.S. Cl. .............. 352/177, 352/178, 352/137, 352/169
[51] Int. Cl. ............................................. G03b 1/00
[58] Field of Search.................. 352/174, 176, 177, 352/178, 179, 137, 169

[56] References Cited
UNITED STATES PATENTS
| | | | |
|---|---|---|---|
| 3,466,124 | 9/1969 | Geisman | 352/177 X |
| 3,397,937 | 8/1968 | Schrader | 352/179 X |
| 1,940,130 | 12/1933 | Howell | 352/177 X |
| 3,376,094 | 4/1968 | Baginski | 352/178 X |

FOREIGN PATENTS OR APPLICATIONS
1,496,948  8/1967  France .............................. 352/174

Primary Examiner—Samuel S. Matthews
Assistant Examiner—Monroe H. Hayes
Attorney—Melvin F. Jager

[57] ABSTRACT

A shutter control system for controlling the exposure of film in a motion picture camera. The system includes shock absorbing apparatus for stopping the shutter in a selected position with minimum impact forces, and apparatus to drive the shutter to the selected position regardless of the point in the operating cycle at which the system is stopped by the camera user. The system further includes an over-center spring to eliminate camera chatter by positively locating the system components in either a run or a stopped position.

6 Claims, 5 Drawing Figures 3,751,149

CAMERA SHUTTER CONTROL SYSTEM

BACKGROUND AND GENERAL DESCRIPTION

This invention relates generally to a shutter control system for motion picture cameras.

A well-designed shutter control system for a motion picture camera must meet many design criteria. For example, the control system should be essentially foolproof, so that it can be readily operated by amateur photographers. Further, the control system should have positive action, so that the camera shutter system is either positively released or engaged as the camera is energized or de-energized. Otherwise, a condition commonly called "chattering" can occur, where the camera components improperly engage when the camera is only partly released for activation. As is well-known, such "chattering" is irritating to the user of the camera, and subjects the camera components to needless and damaging wear. The shutter control system also should stop the camera in a condition which blocks the exposure aperture so that subsequent picture-taking is not inhibited by premature film exposure. Complete aperture blocking must occur regardless of the point in the camera operating cycle at which the camera is shut off. A well-designed camera shutter control system also should minimize the impact shock to the camera components caused by rapidly activating and deactivating the camera.

Accordingly, this invention provides a camera shutter control system which readily meets the above-described design criteria. The control system in accordance with this invention eliminates undesirable camera "chatter" by providing the camera operating tigger with a positive-acting shutter control linkage. The shutter linkage positively maintains the shutter control system in either an "on" or an "off" position, and thereby avoids camera chatter. In addition, the system in accordance with this invention includes means to electrically and mechanically control the operation of the camera shutter so that the shutter is stopped, with a minimum shock force, in a position which blocks the image aperture of the camera. If the camera is de-activated at any point in the operating cycle of the camera other than at a point where the image aperture is blocked, the system includes means to automatically re-activate the camera until the complete blocking of the aperture occurs. The system is then automatically deactivated to retain the aperture in a masked condition.

Briefly, the shutter control system in accordance with this invention includes a shutter disc and a motor for rotating the disc at a selected speed. The disc includes an open portion for exposing the film to the light source, and a closed blocking portion, so that the rotating disc sequentially exposes and blocks light to the movie film. A shutter switch controls the energization of the motor by moving between selected run and stopped positions due to the manual operation of suitable trigger means. A stop on the disc engages the switch in the stopped position and de-energizes the motor to align the blocking portion of the disc with the image aperture of camera. Track and cam means on the disc are arranged to assure that the motor will drive the shutter to block he camera image aperture before the motor is de-energized. Also, a trigger linkage including over-center biasing means is provided to positively retain said switch means in either the run or the stopped position.

EXEMPLARY EMBODIMENT

Further objects and features of the present invention will be readily apparent from a description of an exemplary embodiment thereof, taken in conjunction with the accompanying drawings. Th the drawings.

Figure 1:
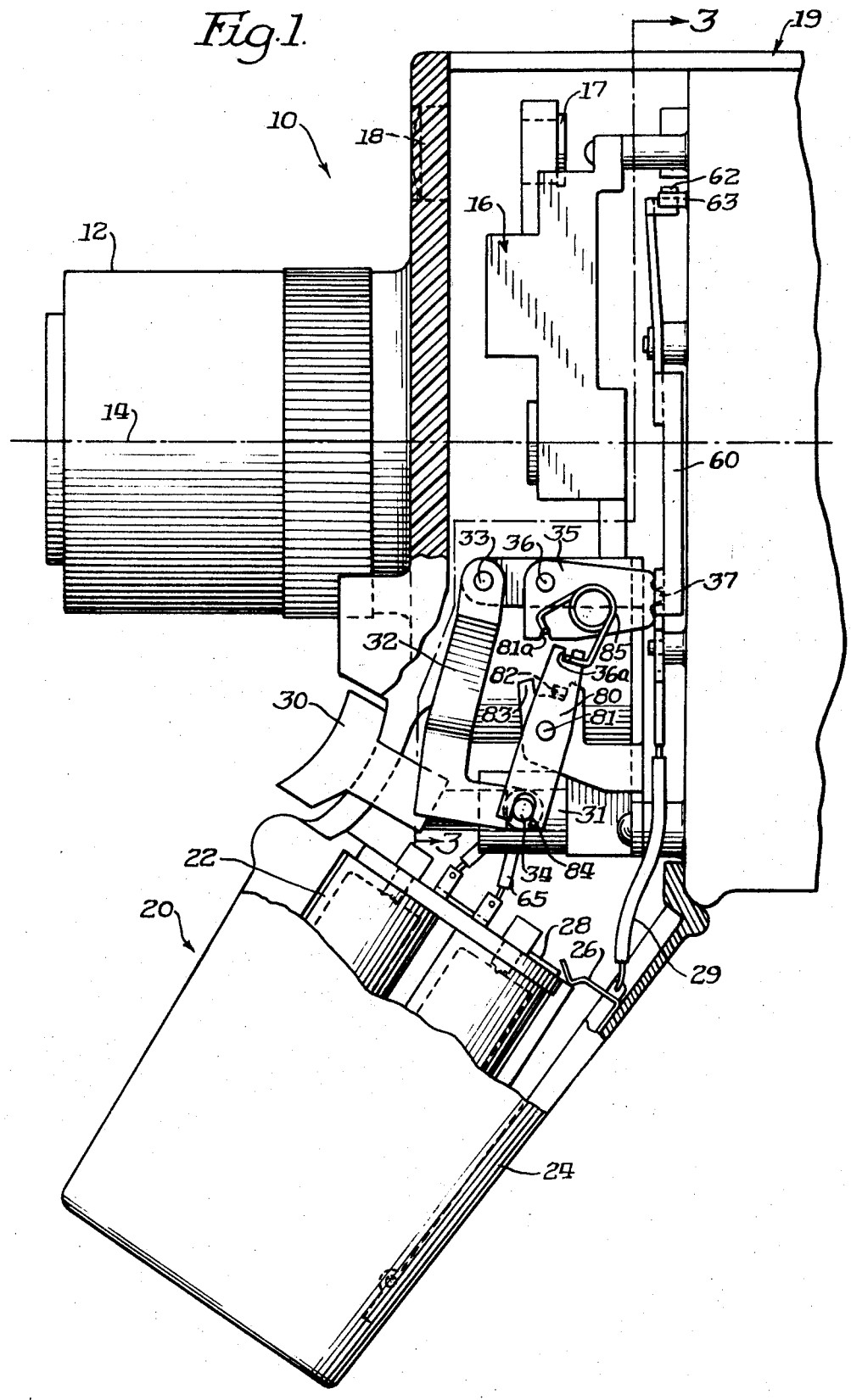
FIG. 1 is a partial sectional elevational view of a motion picture camera incorporating the shutter control system of the present invention, showing the system in a stopped condition.

A camera incorporating the shutter control system in accordance with this invention is generally indicated in the drawings by the reference numeral 10. The camera 10 includes an objective lens system 12 which defines an optical axis 14 for the camera. An exposure control system 16, including a light responsive cell 17 which receives light from the scene through either an auxilary lens 18 or lens system 12 is provided to automatically control the quantity of light gathered by the lens system 12. The body 19 of the camera 10 includes suitable means for storing a supply of motion picture film, and an image aperture in optical alignment with the optical axis 14 through which the film will be exposed during the operation of the camera 10.

The camera 10 also includes a master control grip 20. As seen in FIG. 1, the grip 20 preferably houses a series of batteries 22 which define a power source for energizing the exposure control system 16 and the shutter drive system incorporated within the camera 10. The grip 20 includes a master switch 24 provided along the back portion of the grip. The switch 24 is positioned so that it is closed by the normal grasping of the grip 20, to thereby close the camera control circuit by sliding a switch contact 26 into engagement with a battery contact 28. The closing of the contacts 26 and 28 energize the exposure control and shutter drive systems of the camera 10 by permitting current to flow through lead wire 29 from the batteries 22.

The grip 20 is preferably arranged so that the closing of the master switch 24 will instantaneously activate the exposure control system 16, to set the proper exposure for the lens system 12 before the camera is activated. The front portion of the control grip 20 includes a shutter control tripper 30 arranged to activate the shutter control system to start and stop the motion-picture taking process.

Figure 3:
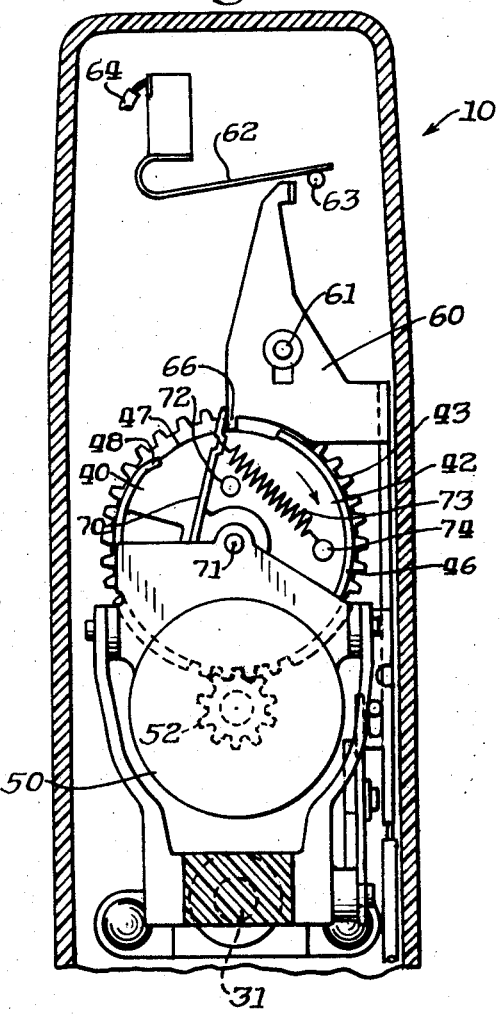
FIG. 3 is an enlarged elevational front view of the shutter control system in a stopped condition as viewed along the line 3—3 in FIG. 1.
Figure 4:
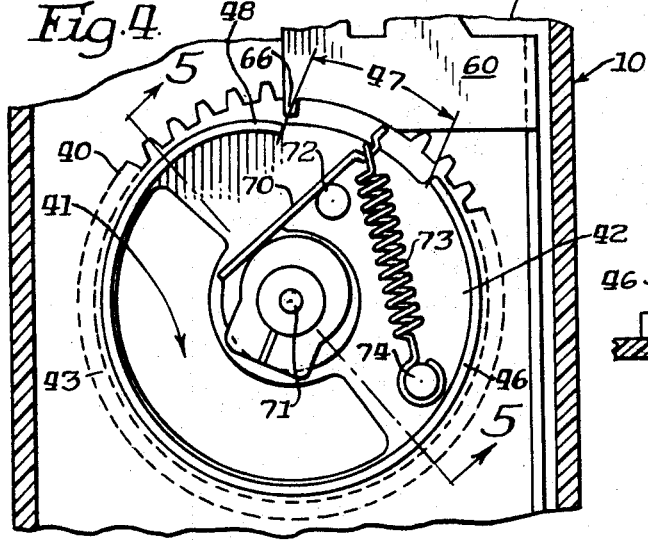
FIG. 4 is an enlarged front view of the rotatable shutter disk embodied in the system of the present invention, illustrating the system in a third condition of operation.
Figure 5:
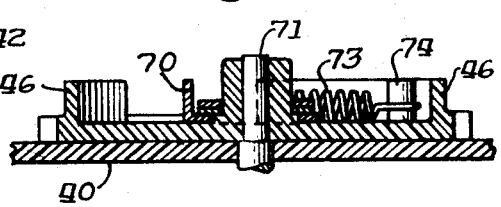
FIG. 5 is an enlarged cross-sectional view of the shutter disk illustrated in FIG. 4.

The shutter system in accordance with this invention incorportes a rotatable shutter disc 40. As seen in FIG. 4, the disc 40 includes an open aperture portion 41 and an opaque blocking portion 42. As illustrated in FIG. 3, the disc 40 is arranged within the body 19 of the camera 10 so that the portions 41 and 42 will rotate into alignment with the optical axis 14 of the camera. An electric drive motor 50 is positioned adjacent the shutter 40. The motor 50 includes a drive pinion 52 which meshes with a ring gear 43 provided around the periphery of the shutter 40. The motor 50 will therefore rotate the shutter disc 40 at a selected speed during the operation of the camera 10.

The energization of the motor 50 is accomplished by the operation of the shutter trigger 30. The trigger 30 is arranged to drive a sliding switch plate 60 upwardly within the camera 10 when the trigger is actuated into the "run" condition. The plate 60 is a current-carrying member, and is connected to the battery 22 by means of the lead 29. A pin and slot arrangement 61 slideably moutns the plate 60 within the camera 10, and defines the limits of movement for the plate. As seen in FIG. 3, a spring contact 62 is normally urged against a stop 63 provided above and in the path of movement of the plate 60. A conductor 64 is connected to the contact 62 and electrically couples the contact 62 with the motor 50. The motor circuit is completed by the return wires 65 (FIG. 1) which lead from the motor 50 back to the power supply batteries 22.

Figure 2:
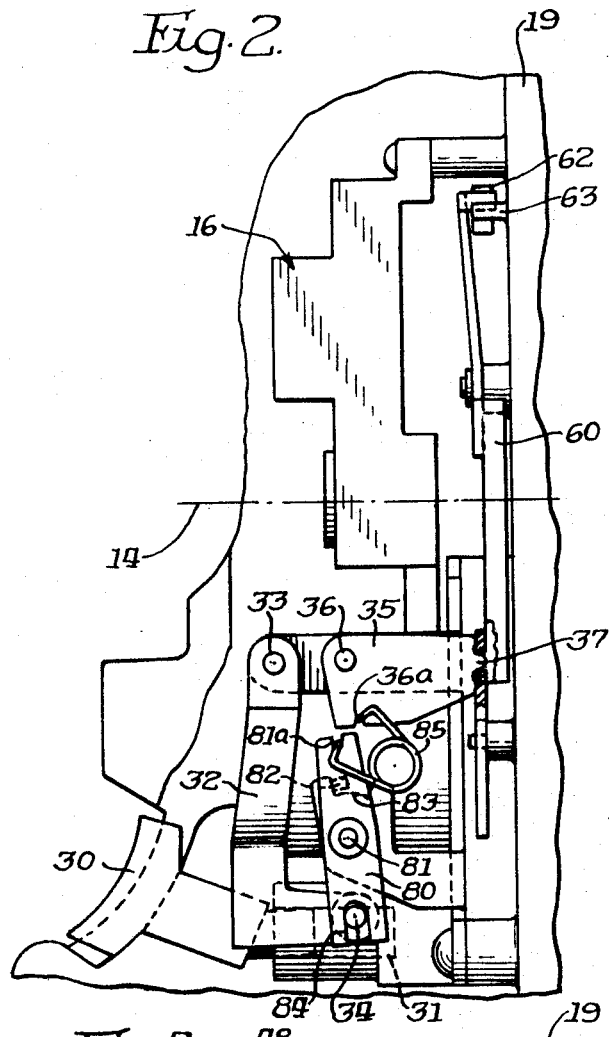
FIG. 2 is an enlarged elevational side view of the camera shutter control system, illustrating the system in a run condition.

As seen in FIGS. 1 and 3, the normal position for the sliding plate 60, when the trigger 30 is not activated, spaces the plate 60 away from the contact 62. Therefore, the circuit for the motor 50 is normally broken. The lowermost position for the sliding plate 60 comprises a "stopped" position for the camera 10. In contrast, as illustrated in FIG. 2, the activation of the trigger 30 operates to raise the sliding plate 60 upwardly into engagement with the spring contact 62. In this raised position, the plate 60 completes the circuit for the motor 50, and the motor 50 will be energized to run the shutter disc 40 at a constant selected speed. The raised position for the plate 60 therefore comprises the "run" position for the camera 10.

The motion of the sliding switch plate 60 is also designed to positively control the operation of the shutter 40. In this regard, as seen in FIGS. 3 and 4, the lower portion of the plate 60 includes a downwardly projecting abutment shoulder 66. The plte 60 is arranged so that the shoulder 66 is aligned with the shutter disc 40 and projects downwardly toward the periphery of the disc. A rim track 46 is provided on the periphery of the disc 40 in the same plane as the shoulder 66. As will be seen from FIG. 3, the disc 40 and member 60 also are arranged so that the engagement between the shoulder 66 and the track 46 retains the sliding plate 60 in its raised run position, with the plate 60 in engagement with the contact 62 to close the motor circuit. The rim track 46 thus retains the motor 50 energized for a selected degree of rotation of the disc 40.

As seen in FIGS. 3 and 4, the disc 40 also includes an arcuate slot 47 cut in the rim track 46. The slot 47 permits the shoulder 66 to disengage from the track 46 so that the plate 60 returns to its lowered stopped position. In this lower position with the shoulder 66 within the slot 47, the circuit through plate 60 and contact 62 is broekn to de-energize the motor 50, and the camera is therefore stopped. The slot 47 is arranged on the disc 40 so that a selected portion of the slot (the rightward portion in FIG. 4) will shut down the camera with the opaque blocking portion 42 in alignment with the optical axis 14. In this manner, the disc 40 defines a "stopped" position for the camera which assures that the film at the exposure aperture will not be exposed when the camera 10 is not in use.

The shutter control system in accordance with this invention also includes means for positively stopping the rotation of the shutter disc 40, in the proper "stopped" position in a manner which minimizes the impact shock forces on the camera components. Thus, the disc 40 includes a stop lever 70 which is mounted on a pivot 71 axle on which the shutter is mounted. As seen in FIGS. 3 and 4, the lever 70 extends outwardly beyond the periphery of the disc 40 within the slot 47. The outer portion of the stop lever 70 is therefore positioned for engagement with the shoulder 66 when the plate 60 is lowered from its run position to its "stopped" position. A stop pin 72 carried by the disc 40 determines the normal location for the lever 70. In addition, a tnesion spring 73 is anchored to a stud 74 carried by the disc 40, and is connected to the outer end of the stop lever 70. The spring 73 retains the lever 70 against the pin 72 and biases the lever in the direction of rotation of the disc 40 (clockwise in FIG. 3). The portion of the slot 47 to the right of the lever 70 can thereby receive the shoulder 66 on the plate 60, and the lever 70 will stop the disc 40 in the desired "stopped" position while absorbing the impact shock load.

A illustrated in FIG. 3, the release of the trigger 30 returns the switch plate 60 downwardly within the camera body 19 toward the disc 40. If the trigger 30 is released during the phase of operation of the camera 10 which locates the track 46 under the shoulder 66, the track will retain the plate 60 in the upward run position. The track 46 thereby maintains the circuit closed to energize the motor 50 and cause the camera to run until the shoulder 66 on the plate 60 enters the slot 47. The plate 60 will then drop to its stopped position and the drive motor 50 will be de-energized. The rotation of the shutter disc 40 is stopped by the engagement between the lever 70 and the shoulder 66. The shock of stopping the disc 40 is absorbed by the expansion of the tension spring 73. The portion of the slot 47 to the left of the lever 70 is designed so that the lever 70 can swing through a selected arc and the spring 73 can absorb substantially all of the expected shock load creted by the momentum of the rotating shutter disc 40.

The above-described engagement between the lever 70 and the shoulder 66 will occur under most conditions when the camera 10 is shut down. However, as illustrated in FIG. 4, the trigger 30 can be released during a point in the camer operating cycle which lowers the shoulder 66 into the left portion of the slot 47 behind the lever 70. Under such circumstances, the plate 60 will be lowered to its stopped position, to de-energize the camera 10, but the shoulder 66 will not engage with the stop lever 70. Thus, it is necessary to operate the shutter disc 40 for one additional cycle in order to rotate the lever into engagement with the shoulder 66. Under normal conditions of operation, the momentum of the motor 50 and the disc 40 is not sufficient to cause a full revolution of the disc 40. However, the momentum of the motor 50 and the disc 40 is sufficient to drive the disc 40 through an arc equal to approximately one half of the width of the slot 47.

In accordance with this invention, the momentum of the disc 40 is utilized to re-energize the motor 50 in order to drive the disc 40 through an additional complete cycle, and thereby engage the lever 70 with the shoulder 66. Accordingly, the portion of the track 46 adjacent the slot 47 is provided with a lifitng cam 48. As seen in FIG. 4, the cam 48 is designed to engage with the shoulder 66 as the disc 40 rotates in a clockwise direction. The rotation of the disc 40 will cause cam 48 to raise the plate 60 intl the run position, and will engage the plate 60 with the contact 62. The motor circuit is thereby completed, and the motor 50 is re-enegized to drive the disc 40 through an additional cycle. As long as the shoulder 66 is retained in the run position by the track 46, the plate 60 will remain in the raised "run" position to cause the motor 50 to be energized, to theregy drive the shutter 40. Thus, the shutter 40 will rotate the stop lever 70 into engagement with the shoulder 66, and the shutter will be stopped with the blocking portion 42 aligned with the optical axis 14.

The shutter control system in accordance with this invention also includes trigger linkage which positively drives the switch plate 60 between the raised "run" and lowered "stopped" positions. The trigger 30 is normally biased to an outward, released position by a compression spring 31. The trigger 30 is connected to a first trigger arm member 32. The arm 32 is pivotally supported on the camera body 19 by a pin 33, and is generally L - shape in configuration. The lower end of the arm 32 carries a stud 34. A second trigger link 35 is provided in the body 19 on a pivot pin 36. As illustrated in FIGS. 1 and 2, the line 35 includes a projection 37 which engages with the sliding switch plate 60, so that the pivotal movement of the link 35 about the pin 36 will operate to raise the plate 60 upwardly into its run position.

The trigger linkage also includes a connecting link 80 pivotally mounted on a pin 81 in a position between the links 32 and 35. A lug 82 and slot 83 are provided to define the limit of rotation of the link 80. Th addition, a slot 84 is provided on the lower portion of the link 80 for engagement with the stud 34, so that the movement of the trigger link 32 is transmitted to the link 80. An over-center torsion spring 85 is provided to connect the link 80 to the link 35. As seen in FIGS. 1 and 2, the spring 85 is positioned over-center with respect to the pivot pins 36 and 81 for the links 35 and 80, respectively, by connecting the spring in off-set retaining notches 36a and 81a on the links. This over-center arrangement causes the biasing force of the spring 85 to positively drive the links 80 and 35 from their initial position, as shown in FIG. 1, to a second position, as shown in FIG. 2, in response to the actuation of the trigger 30.

The over-center position for the spring 85 thereby prevents the trigger linkage from stopping in any intermediate position between these first and second positions. In that second position, as seen in FIG. 2, the links 35 and 80 operate to forcefully raise the plaet 60 into the run position, to energize the camera drive motor 50. When the trigger 30 is released, the compression spring 31 returns the trigger and the links 32, 35 and 80 to the initial positions. The forces of the springs 31 and 85 combine to positively return the plate 60 to the normal stopped position, to thereby stop the operation of the camera 10.

The over-center biasing force of the spring 85 thus assures that the plate 60 will be positively positioned either in the raised position, where the shoulder 66 is free from the stop lever 70, or the lowered position, where the shoulder and arm will engage. Such an operation occurs because the spring 85 prevents the trigger linkage from stopping in an intermediate position. The trigger linkage including the spring 85 thereby eliminates camera "chatter" and wear which would be caused by the partical engagement of the shoulder 66 and the lever 70 or the disc 40 during the operation of the camera 10.

Although the present invention has been described wtih a certain degree of particularity, it should be understood that the present disclosure has been made only by way of example. Consequently, numerous changes in the details of construction and the combination and arrangement of components as well as the possible modes of utilization, will be apparent to those familiar with the art, and may be resorted to without departing from the spirit and scope of the invention as claimed.

What is claimed is:

1. A shutter system for controlling the exposure of film through an image aperture in a motion picture camera comprising:

a rotatable shutter including an open exposure portion and an opaque portion;

motor means adapted to rotate said shutted at a selected speed;

switch means movable between a run position which energizes said motor and a stopped position which de-energizes said motor;

trigger means connected to move said switch means between said run and stopped positions;

camera stop means provided on said shutter and positioned to cooperate with said switch means to maintain said switch means in said stopped position, and thereby de-energize said motor with said opaque portion of said shutter in optical alignment with the image aperture of the camera;

track means provided on said shutter adjacent said camera stop means and engageable with said switch means to maintain said switch means in said run position, and thereby continue the energization of said motor for a selected degree of rotation of said shutter; and cam means provided on said shutter adjacent said track means and arranged to engage with said switch means to move said switch means from said stopped position to said run position and engage said switch means with said track means, so that said motor is energized and rotates said shutter through said selected degree of shutter rotation defined by said track means.

2. A shutter system in accordance with claim 1 wherein said trigger means is connected to said switch means through a biased over-center linkage which positively drives said switch means into both of said run and stopped positions and prevents the linkage from stopping in an intermediate position.

3. A shutter system in accordance with claim 1 wherein said camera stop means comprises an energy-absorbing member on said shutter engageable with said switch means to stop the rotation of said shutter and simultaneously dampen the impact shock forces on said sytem.

4. A shutter system for controlling the exposure of film through an image aperture in a motion picture camera comprising:

a rotatable shutter including an open exposure portion and an opaque portion;

motor means adapted to rotate said shutter at a selected speed;

switch means movable between a run position which energizes said motor and a stopped position which de-energizes said motor;

trigger means connected to move said switch means between said run and stopped positions;

a rim on said shutter defining an arcuate track engageable with said switch means to maintain said switch means in said run position for a selected degree of rotation of said shutter;

an arcuate stop portion provided on said rim to release said switch means from said track and move said switch means to said stopped position for a selected degree of rotation of said shutter;

detent means positioned within said stop portion and engageable with said switch means to stop the rotation of said shutter with said opaque portion in optical alignment with the image aperture of the camera;

energy-absorbing means connected to said detent means to dampen the impact shock forces resulting from stopping said shutter; and cam means provided on said rim following said detent means to move said switch means from said stopped position to said run position by engaging said switch means with said track, so that said motor means rotates said shutter and engages said detent means with said switch means to stop said shutter with said opaque portion in optical alignment with the image aperture whenever said motor is de-energized by said trigger menas.

5. A shutter system in accordance with claim 4 wherein said stop portion comprises a slot in the rim of said shutter adapted to receive said switch means and move said switch means from said run to said stopped position and said detent menas comprises a spring-biased member mounted ithin said slot for engagement with said switch means as said shutter is rotated by said motor.

6. A shutter system in accordance with claim 4 wherien said trigger means is connected to said switch means by a linkage comprising a first link member joined to said trigger means, a second link member joined to said switch means, and an over-center spring member joining said first and second links and exerting a biasing force on said links which positively retains said switch means in either said run or said stopped position and prevents said switch means from stopping in an intermediate position.

* * * * *